United States Patent
Poehlmann (10) Patent No.: US 9,580,936 B2
(45) Date of Patent: *Feb. 28, 2017

(54) BICYCLE HANDLEBAR-STORED CABLE LOCK

(71) Applicant: Christopher Harold Poehlmann, Annapolis, CA (US)

(72) Inventor: Christopher Harold Poehlmann, Annapolis, CA (US)

(*) Notice: Subject to any disclaimer, the term of this patent is extended or adjusted under 35 U.S.C. 154(b) by 354 days.

This patent is subject to a terminal disclaimer.

(21) Appl. No.: 14/305,986

(22) Filed: Jun. 16, 2014

(65) Prior Publication Data

US 2014/0290314 A1   Oct. 2, 2014

Related U.S. Application Data (63) Continuation-in-part of application No. 13/605,706, filed on Sep. 6, 2012, now Pat. No. 8,756,960.

(60) Provisional application No. 61/531,618, filed on Sep. 7, 2011.

(51) Int. Cl.
| | |
|---|---|
| *E05B 71/00* | (2006.01) |
| *B62H 5/00* | (2006.01) |
| *E05B 73/00* | (2006.01) |
| *E05B 67/00* | (2006.01) |

(52) U.S. Cl.
CPC .......... *E05B 71/00* (2013.01); *B62H 5/003* (2013.01); *E05B 67/003* (2013.01); *E05B 73/0011* (2013.01); *Y10T 70/409* (2015.04)

(58) Field of Classification Search
CPC .... E05B 71/00; E05B 67/003; E05B 73/0011; E05B 73/0005; B62H 5/003; B62H 5/04; Y10T 70/409; Y10T 70/435; Y10T 70/483; Y10T 70/491; Y10T 70/5872; Y10T 70/5876; Y10T 70/5881
USPC ....... 70/14, 18, 30, 49, 52, 53, 58, 233–235; 211/5, 17
See application file for complete search history.

(56) References Cited

U.S. PATENT DOCUMENTS

| | | | | |
|---|---|---|---|---|
| 1,472,206 A | * | 10/1923 | Burkle | .................. E05B 67/003 70/25 |
| 1,991,825 A | | 2/1935 | Strickland | |
| 2,623,378 A | | 12/1952 | Haver | |

(Continued)

OTHER PUBLICATIONS

TechFlex, Inc., archived web pages from the website at http://www.techflex.com/prod_kvx.asp, that were accessible over the Internet at least as early as Jul. 19, 2011.

(Continued)

*Primary Examiner* — Lloyd Gall
(74) *Attorney, Agent, or Firm* — Kolisch Hartwell, P.C.

(57) ABSTRACT

A lock assembly for a bicycle may comprise a shackle and a lock body. The shackle may have first and second end portions, and a central portion. The shackle may include a cable disposed in a cushioning sleeve extending between the first and second end portions. A resilient member may be disposed on or included in the central portion of the shackle. The first end portion may include a locking member, and the second end portion may be connected to the lock body. The lock assembly may be operable between stowed position corresponding to the shackle and a portion of the lock assembly contained within a bore of a handlebar of the bicycle, and a removed position corresponding to the lock assembly removed from the bore.

18 Claims, 5 Drawing Sheets

(56) References Cited

U.S. PATENT DOCUMENTS

| | | | |
|---|---|---|---|
| 3,800,575 A | | 4/1974 | Perret, III |
| 4,023,387 A | * | 5/1977 | Gould ................... B62H 5/08 137/355.23 |
| 4,024,741 A | | 5/1977 | Arblaster |
| 4,064,714 A | * | 12/1977 | Treslo ................... B62H 5/003 70/18 |
| 4,186,576 A | | 2/1980 | Means et al. |
| 4,597,273 A | | 7/1986 | Reichenberger |
| 4,693,098 A | | 9/1987 | Davis et al. |
| 4,807,453 A | * | 2/1989 | Bernier ................... B62H 3/00 211/5 |
| 4,845,967 A | | 7/1989 | Evans et al. |
| 4,870,843 A | | 10/1989 | Lundberg |
| 4,970,883 A | | 11/1990 | Johnson |
| 5,255,546 A | * | 10/1993 | Saunders ............... B62H 5/003 70/233 |
| 5,289,704 A | | 3/1994 | Johnson |
| 5,513,508 A | | 5/1996 | Saunders et al. |
| 5,636,539 A | * | 6/1997 | Tsai ........................ E05B 37/02 70/30 |
| 5,638,710 A | * | 6/1997 | Howard, Jr. ......... B62D 43/007 224/42.23 |
| 5,752,416 A | | 5/1998 | Nien |
| 5,802,888 A | * | 9/1998 | Parsons ................... A61F 5/37 128/879 |
| 5,889,463 A | * | 3/1999 | Judd ................... B60R 25/1001 340/425.5 |
| 6,505,846 B1 | | 1/2003 | Hoffman |
| 6,536,246 B2 | | 3/2003 | Wilson et al. |
| 6,595,031 B2 | * | 7/2003 | Wilson ................... B62H 5/003 70/233 |
| 6,799,445 B1 | * | 10/2004 | Tsai ..................... E05B 37/0031 70/284 |
| 7,159,423 B1 | * | 1/2007 | Mrdeza ................. B62J 11/005 224/420 |
| 7,870,764 B2 | * | 1/2011 | Burmesch ............. E05B 37/025 70/233 |
| 8,132,437 B1 | | 3/2012 | Chen |
| 8,756,960 B2 | * | 6/2014 | Poehlmann ............ B62H 5/003 70/233 |
| 2002/0104337 A1 | * | 8/2002 | Kuo ..................... E05B 37/025 70/30 |

OTHER PUBLICATIONS

Electriduct, Inc., archived web pages from the website at http://www.electriduct.com/Flexo-Noise-Reduction-Sleeving.html, that were accessible over the Internet at least as early as Nov. 22, 2012.

Jun. 21, 2013, Office action from U.S. Patent and Trademark Office, in U.S. Appl. No. 13/605,706, which shares the same priority as this U.S. patent application.

Nov. 21, 2013, Office action from U.S. Patent and Trademark Office, in U.S. Appl. No. 13/605,706, which shares the same priority as this U.S. patent application.

* cited by examiner

BICYCLE HANDLEBAR-STORED CABLE LOCK

CROSS-REFERENCES TO RELATED APPLICATIONS

This application is a continuation-in-part application of U.S. patent application Ser. No. 13/605,706, filed Sep. 6, 2012, which claims priority to U.S. Provisional Patent Application Ser. No. 61/531,618, filed Sep. 7, 2011, which are hereby incorporated by reference in their entirety.

FIELD

This disclosure relates to security devices, specifically to portable cable locks for securing from theft articles such as bicycles, vehicles and devices employing tubular handlebars and tubular elements, and the accessories of said articles.

INTRODUCTION

Previously, bicycle cable locks when not in use have primarily been stored in either a cargo bag or device attached to the bicycle, coiled around the tubes comprising the frame, or on the body of the rider. This makes use (retrieving, uncoiling, locking, and subsequent stowing of the lock after use) time consuming and difficult. External storage of the lock can also cause chipping of the bike's paint finish. External storage of the coiled or uncoiled cable lock is also aesthetically undesirable for appreciating the overall design of the bicycle. External storage is also unfavorable aerodynamically and weight wise for those riders concerned with optimum equipment performance.

Thereafter inventors created several lock designs that addressed ways to conceal the lock and cable attached thereto. U.S. Pat. No. 4,024,741 shows a solution to the concealment and stowing need, employing the internal bore of the handle bars as the storage area; however this lock is: prohibitively heavy, involves permanently installing lock components to the handle bars, and requires a complicated multi-stage process to deploy and use involving unattached parts. Further, it features a short maximum cable length, an inability to detach the lock completely from the bike to allow for minimum bicycle weight and other security uses, and substantially adds to the length of one of the distal ends of the handlebar, which may be a safety concern due to interference with the rider's knees during peddling. Additionally, the complicated design of the locking mechanism would be expensive to manufacture and adds unnecessary weight and difficulty in its permanent installation needs.

Additionally, U.S. Pat. No. 4,597,273 proposes a simpler design that is primarily aimed at securing ski poles by using the tubular bore of the pole for a storage location. Its application would not be applicable in its proposed design due to the exposed metal components that would allow for paint damage to expensive bicycle frame members along with potential for injury to the rider. Its design is also unable to comply with the need of secure affixment in the handle bar during the vibration caused by riding. Additionally, the long loop created by the crimped and folded end of the non-locking end of the cable would not successfully navigate the multiple curves of the interior bore of road bicycle handlebars during insertion and retrieval.

U.S. Pat. No. 4,693,098 allows for insertion and retrieval of the cable into multiple curved handlebars but requires the use of a clamp-on, heavy, keyed lock that is shown attached to the outside of a bicycle frame tube member. This defeats the need for aerodynamic and aesthetic invisibility. No provisions have been included to keep the cable from moving out of the handlebar due to vibration during bicycle use.

A lightweight combination lock and concealed storage in the tubular interior of vehicle handlebars is featured in U.S. Pat. No. 4,870,843. However, in the design additional weight is added by making the design a self-retracting one utilizing linked chain and having the chain retract for storage in two parts utilizing both open ends of the handlebar. This design is prone to failure due to its use of springs and additionally introduces safety concerns due to the exposed combination lock and its mating toothed lock pin exposed during bicycle use. This configuration of the design exposes the rider's body to sharp metal surfaces and makes that eventuality more likely as it adds to the effective length of the handlebar toward the rider. This design additionally requires permanent installation, difficulty in retrieval of failed components, the inability to remove the lock entirely for maximum bicycle lightness, and the inability to remove and employ the lock for securing accessories or other bike components away from the immediate area of the handlebar. Noise and rattling would probably be a detraction during use in the lock's storage mode as the chain and retraction springs would interact with the interior bore of the handlebar.

In U.S. Pat. No. 4,186,576 the safety problem regarding rider's knees of the previously addressed designs is solved but weight continues to be a design problem due to the use of a keyed lock utilized and its need for large metal components. The lock is cumbersome to use due to the need to unlock and retract a lock body, flip of one of the cables from rear to front orientation, remove one cable ball end, carefully replace the ball end after wrapping the cable about the item to be secured, and reinsert the lock and lock with a key. The design necessitates a manufacturer's alteration of the handlebar end to have a close tolerance hole drilled into the dorsal side of the aluminum or carbon fiber handlebar near one end opening. This is an operation that few bicycle owners would be prone to do themselves or have done. Having handlebar tape on the bars would prevent visual inspection of the locked or not locked nature of the locking pin positioning. The user is also tasked with finding the location of the hole to align with the locking pin to allow insertion and securing by key turning. The design also presupposes that one size lock body fits all handlebar interior bores, which is decidedly not the case. No aspect of the design allows for adaptation of the lock body to varying interior bores of existing handlebars. A close tolerance fit is essential for the reliable operation of this lock.

U.S. Pat. No. 4,970,883 addresses some of the drawbacks of the aforementioned prior art but introduces its own distinct disadvantaging features. A more compact design is proposed utilizing a combination lock with a flexible shackle cable and a depressing button release to free the cable end from the lock body. This design again needs to be constructed with substantial amounts of metal, making it heavy for weight conscious riders and requiring portions of it to be permanently attached to the handlebar. In this design the inventor suggests that a needed sleeve mounted permanently inside of the handlebar for lock storage should be attached with adhesive. The inventor does not account for the many different interior diameters found in the range of handlebars available and the need to supply the needed close tolerance fit for the aforementioned sleeve.

The depressing button needed to release the cable end is shown protruding out of the end of the end of the handle bar, raising the aforementioned safety concerns for the rider.

Spring loaded detent balls engaging into annular grooves in the interior bore of the sleeve are proposed to secure the lock housing. The ball idea, magnets, spring fingers or thread solutions additionally offered as securing options would all pose problems in the available space available in the interior bore of most handlebars. These complicated mechanical solutions for securing the lock housing introduces the likelihood for common failure due to the miniaturization needed, the relatively high amounts of contaminates exposed to outdoor equipment, and the tolerances needed between the sleeve and the lock housing. The proposed design again exposes the rider to injury due to the metal protuberances and the considerable additional effective length of one end of the handlebar facing the rider.

Undesired weight is added from the design's additional components to the traditional two piece combination lock design featuring a toothed pin mating axially into a lock body with spinning numbered lock rings, see U.S. Pat. No. 1,472,206. Additional lock parts are needed to interact with the pawl mechanism associated with the cable end caps. Contamination commonly found in outdoor environments is sure to hinder reliability of this device due to the many additional moving parts and reliance on small spring components.

The shown length needed in U.S. Pat. No. 4,970,883 for the entire sleeve-lock body-cable caps configuration would not fit into the approximately 2 inches of length available in the straight distal section of most road, or "rams horn" shaped bicycle handlebar ends. After this straight approximate two inches, the interior bore bends acutely upwards and prevents insertion of rigid straight objects.

A similar invention idea was proposed with U.S. Pat. No. 5,289,704 using a combination lock that controls the release of a latch body on a free end of a flexible shackle and inserted in one end of a tube, typically a bicycle frame member or ski pole. This effort suffers from the same weight gains as U.S. Pat. No. 4,970,883 as it requires additional locking components than a common cylinder combination lock and additionally features a screw operated mechanical securing feature.

The distal end of the lock features a large round knob that must be turned to secure or release the lock from the interior bore of the tube. The twisting either expands a rubber plug that engages the interior bore and locks the lock in place or releases the squeezing on the plug which contracts and assumes a smaller diameter and releases, and allowing the lock to be pulled out of the bore of the tube. This time consuming, mechanical solution requires additional components such as the screw, a mating threaded nut, a sufficiently large knob to turn, and a large, dense rubber plug. The more moving parts of this design with its springs, plunge pins, screws, friction surfaces, rubber components and small in size locking surfaces all add up to more reliability and maintenance problems which add up to reduced security, all undesirable for a locking security device.

SUMMARY

In one example, a lock assembly for a bicycle may include a shackle, a resilient member, and a lock body. The shackle may have a first end portion, a second end portion, and a central portion between the first and second end portions. The first end portion may include a locking member. The shackle may include a cable disposed in a cushioning sleeve such that an outer surface of the cable faces an inner surface of the cushioning sleeve and an outer surface of the cushioning sleeve faces away from the outer surface of the cable. The cable and the cushioning sleeve may extend between the first and second end portions. The resilient member may have a first end, a second end, an inner surface, and an outer surface. The inner surface of the resilient member may be disposed on the central portion of the shackle. The lock body may be connected to the second end portion of the shackle. The lock body may include a plurality of rotating tumblers, and a hole for receiving the locking member when the plurality of rotating tumblers are in an open position. The lock body may be configured to prevent removal of the locking member from the hole when the plurality of rotating tumblers are in a locked position. The lock assembly may be operable between a stowed position and a removed position. The stowed position may correspond to the central portion of the shackle contained within a bore of a handlebar of the bicycle, the resilient member in a compressed state to hold the shackle against opposing sides of an interior surface of the bore by the first end of the resilient member pressing against one of the opposing sides and the second end of the resilient member pressing against the other of the opposing sides to reduce movement of the shackle relative to the interior surface during vibrations of the handlebar thereby reducing noise produced by the shackle in the stowed position during such vibrations, and the cushioning sleeve disposed between the cable and the interior surface and in contact with the interior surface to reduce acceleration of the cable relative to the interior surface caused by such vibrations of the handlebar thereby further reducing noise produced by the shackle in the stowed position during such vibrations. The removed position may correspond to the lock assembly removed from the bore, and the resilient member in an expanded state.

In another example, a lock assembly for a bicycle may include a flexible shackle and a lock body. The shackle may have a long axis, and a first end portion, a resilient central portion, and a second end portion serially disposed along the long axis. The resilient central portion may have a greater thickness than the first and second end portions proximal the resilient central portion in a direction perpendicular to the long axis. The first end portion may include a locking member. The lock body may be connected to the second end portion of the shackle. The lock body may include a plurality of rotating tumblers, and a hole for receiving the locking member when the plurality of rotating tumblers are in an open position. The lock body may be configured to prevent removal of the locking member from the hole when the plurality of rotating tumblers are in a locked position. The lock assembly may be operable between a stowed position and a removed position. The stowed position may correspond to the shackle and a rear end portion of the lock body being contained within a bore of a handlebar of the bicycle, and the resilient central portion in a substantially folded state to press the shackle against opposing sides of the bore and thereby reduce noise produced by the shackle in the stowed position during vibrations of the handlebar. The removed position may correspond to the lock assembly removed from the bore, and the resilient central portion in a substantially unfolded state.

In another example, a lock assembly for a bicycle may include a shackle having first and second end portions, and a lock body connected to the second end portion of the shackle. The first end portion may include a locking member. The shackle may include a cable and a layer of cushioning material surrounding the cable. The cable and the cushioning material may extend between the first and second end portions. The lock body may include a plurality of rotating tumblers, and a hole for receiving the locking member when the plurality of rotating tumblers are in an open position. The lock body may be configured to prevent removal of the locking member from the hole when the plurality of rotating tumblers are in a locked position. The lock assembly may be operable between a stowed position and a removed position. The stowed position may correspond to the shackle and a rear end portion of the lock body being contained within a bore of a handlebar of the bicycle, and the cushioning material being disposed between the cable and an interior surface of the bore to reduce accelerations of the cable relative to the interior surface caused by vibration of the handlebar thereby reducing noise produced by the shackle in the stowed position. The removed position may correspond to the lock assembly removed from the bore of the handlebar.

DETAILED DESCRIPTION

This disclosure generally relates to a cable lock and its storage in a bicycle handlebar with no modifications of said handlebar. Embodiments disclosed herein may provide a lock that is lightweight for use with light bicycles; a lock that stores within the existing handlebar of a bike that is discreet and does not add any aerodynamic drag; a lock that simply adapts to all common handlebar interior bores without modification of said bores; a lock that is simple to use and does not require any more than a simple pull to deploy the lock; a lock that has few moving parts and is simple to produce and maintain; a lock that can be removed away from the bike to secure other articles; a lock that in use does not mar or damage the article it is securing; and/or a lock that does not add any rider safety issues over commonly found bicycle components and accessories.

According to the present teachings, an improved cable lock which can be used to lock a vehicle such as a bicycle and can be stored within the bike handle, the lock housing may be cylindrical in shape and elongated on its axis including a locking means comprising a dial type combination lock having a plurality of rotating tumblers and a cable having one end secured near the posterior of the locking housing and the second end having a toothed pin either removably attachable through a small opening in the anterior of the locking housing into the combination lock to lock the bike to an object or removably held in a rubber toothed pin holder in the posterior of the locking housing when the cable and the lock housing are stored in the bicycle handle bar. To hold the cable lock in place in the handlebar, rings may be located at both ends of the lock housing having radially outwardly extending resilient friction fingers that contort to conform to the interior bore of the handlebar. To reduce the length of the cable when inserted into the vehicle or bicycle handlebar and better facilitate the insertion, the cable may be bent substantially 180 degrees at its midpoint where a small ball is attached to the cable. In other embodiments, the cable may be disposed in a cushioning sleeve and a resilient member may be disposed on a central portion of the cable and/or the cushioning sleeve to reduce noise produced by the cable when inserted inside the handlebar. The resilient member may also provide for easier insertion of the cable into the handlebar and/or reduce abrasion of the cushioning sleeve by an interior surface of the handlebar.

Embodiments of the present teachings may solve all the above problems of discussed in the above introduction by completely storing the entire cable lock within the unused interior bore of the bicycle's handlebar while allowing for lightweight, simple design, low cost and ease and speed of use plus additional advantages. Their features allow for easy retrieval, use, and stowing with no additional aerodynamic drag added to the bike. Embodiments of the present disclosure may not introduce any sources of potential injury to the rider. These embodiments may have completely disappearing storage modes, enabling the bicycle owner to have a visually unencumbered machine and the ability to carry a discreet security device to protect from theft. These locks may adapt to any of the common interior bore sizes of handlebars. The embodiments may not compromise the structure of any bicycle component as no portion of it is permanently attached to the bicycle. The deployed lock can also be used for any number of security applications beyond use with a bicycle. These could include helmets, gloves, packs, clothing, etc.

While embodiments have been described above and will be described below with many specificities, these should not be construed as limiting the scope of the disclosure but as merely providing illustrations of some of the presently preferred embodiments. It is to be understood that the scope of this disclosure is not limited to the disclosed embodiments. On the contrary, the present teachings are intended to cover various modifications and equivalent structures included with the spirit and scope of the appended claims.

Figure 1:
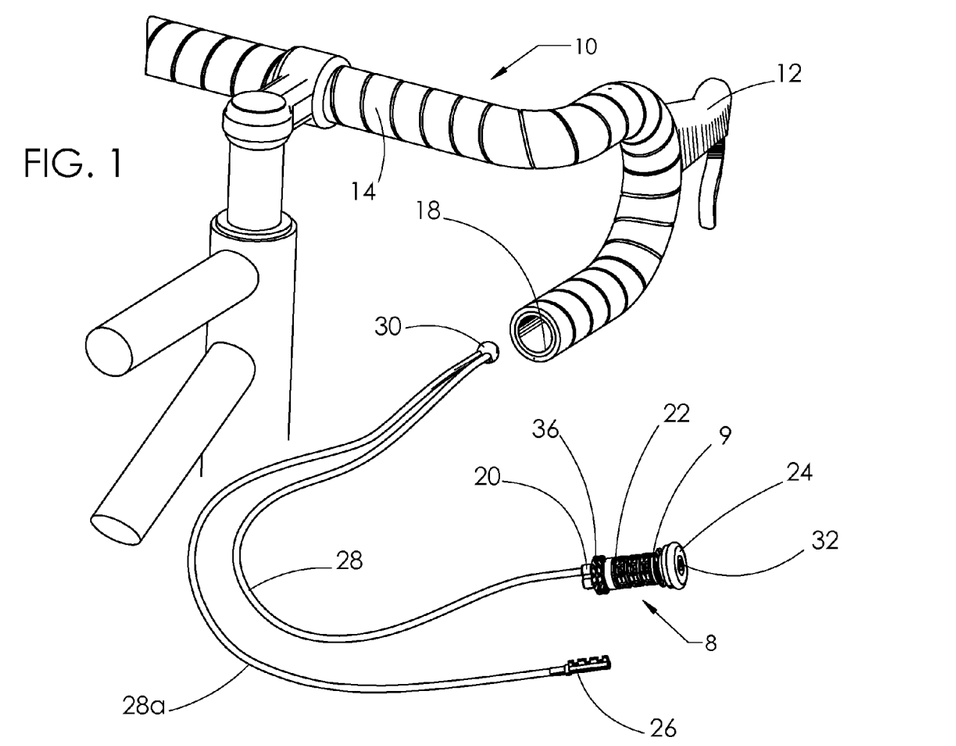
FIG. 1 is a perspective view of the bicycle handlebar-stored cable lock ready for insertion into a bicycle handlebar.

FIG. 1 is a perspective view of the basic version of the handlebar stowing cable lock and the bicycle tape wrapped handlebar 10 with the exposed end of the handlebar opening 18 the cable lock will be inserted into. FIG. 1 shows lock assembly 8 in a removed position (e.g., FIG. 1 shows lock assembly 8 completely removed from a bore of handlebar 10). The lock assembly 8 is formed from a lock body 9 and a folded cable or shackle compromising separate portions 28, 28a. A toothed pin 26 is crimped onto the end of one of the plastic coated metal cable portion 28a. The toothed pin 26 is shown not yet inserted into the rubber toothed pin holder 20 in preparation for storing the lock within the tape wrapped handlebar 10. The end of the other plastic coated cable portion 28 is mechanically crimped inside an integrated crimping ferrule 21 affixed onto the posterior of the lock body 9. The rubber toothed pin holder 20 both encapsulates the cable end and crimping ferrule 21 along with providing a shaped chamber to accept and hold the toothed pin 26 during the storage configuration of the lock. The rubber toothed pin holder 20 is shown attached to the rear of the three-tumbler combination lock 22. Because the lock is intended to be stored in the narrow bore of a handlebar, the mid-point of the cable is fastened in a plastic ball end 30 with both cable halves exiting the same side of the ball in close proximity and parallel. The two cable portions 28 and 28a are thus held in narrow profile to easily slip into the handlebar. The cable is bent 180° back on itself to form a bend roughly at its midpoint with the small plastic ball end 30 secured at the bend. In other words, a first portion of the cable extends into ball end 30 where the cable forms a 180° bend from which a second portion of the cable extends out of ball end 30, as shown in FIG. 1. This ball is inserted first and allows for the easy travel of the doubled cable past the interior bends and any obstructions in the interior of the handlebar. The toothed pin holder 20 is secured to the posterior of the lock body 9 and removably secures the toothed pin while the lock assembly is stored within the handlebar. The pin holder 20 and the lock body 9 with its rubber rings of friction fingers 36 follows the ball and doubled cable into the bar opening and is inserted until it is entirely within the interior of the bar and the back side of the rubber bar end cap 24 is in contact with and sealing the handlebar opening 18.

The rigidity of the cable portions 28 and 28a and ball 30 allow for the user to insert the lock in short strokes until the entire length of the cables are within the handle bar bore and successfully navigated past the bends in the bar. The strong yet flexible plastic covered metal cable 28 and 28a is adequate enough to afford security against theft for the owner of an expensive bicycle and to allow for an occasional short absence away from the bike during a ride. Situations where there is needed security for overnight, long term, or within an area of high theft risk, the bicycle owner will employ appropriately more robust locks not made for carrying on rides where performance and aesthetics are an issue.

Figure 2:
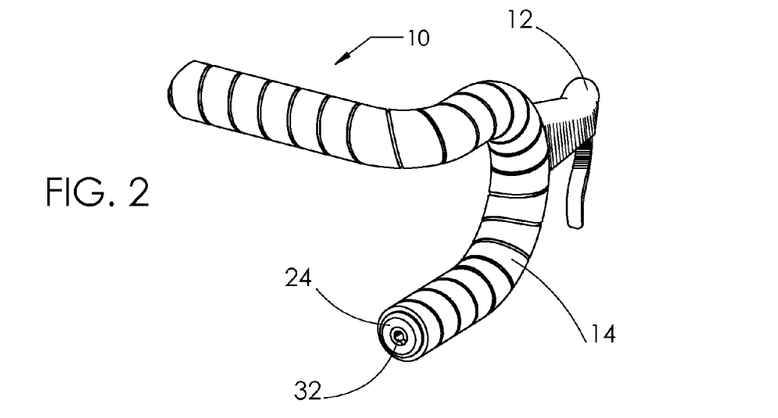
FIG. 2 is a perspective view of the cable lock inserted into a bicycle handlebar.

The stored configuration of the lock is seen in FIG. 2 in a perspective view of the lock end cap 24 in position at the handlebar opening 18. In this view the toothed pin 26 has been inserted into the toothed pin holder 20 and the ball end 30 with the two cable halves has been inserted into the end of the handlebar opening 18. The ball end 30 with its smooth surfaces allows easy navigation of the shackle past the bends in the handlebar. One such bend is adjacent to the handbrake 12 attachment point on the outside of the handlebar. The shackle is guided into the bar until the entire length of the lock assembly 8 is within the bar and only the lock end cap 24 is seen. The handlebar tape 14 is shown wound around the outside surface of the handlebar and has its final winding at the end of the handlebar capped and protected by the lock cap end 24 when it is in place in the handlebar opening 18. This is also shown in the cross-section of FIG. 5. In this stored position only the lock end cap 24 with its axial positioned toothed pin hole 32 is exposed.

The lock's existence in place is only revealed by the small toothed pin hole 32 in the rubber lock end cap 24 made to accept the insertion of the lock's toothed pin 26. Other than this hole, the cap is the same shape, size, and usual material as a standard handlebar end cap. Thus concealed, it protects from its theft and aesthetically does not detract from standard aerodynamic and compact bicycle components. The end cap's rubber material is soft and non-marring to the bicycle when in use and safely protects the rider's body from injurious contact with the handlebar ends. The lock design allows the complete removal of all components of the lock and the selective use of a standard bar end plug to seal the end of the handlebar 18. This option allows the rider to have the lightest weight bicycle as possible for maximum performance and for rides where the rider does not anticipate the need to lock the bike for security.

Figures 3, 4:
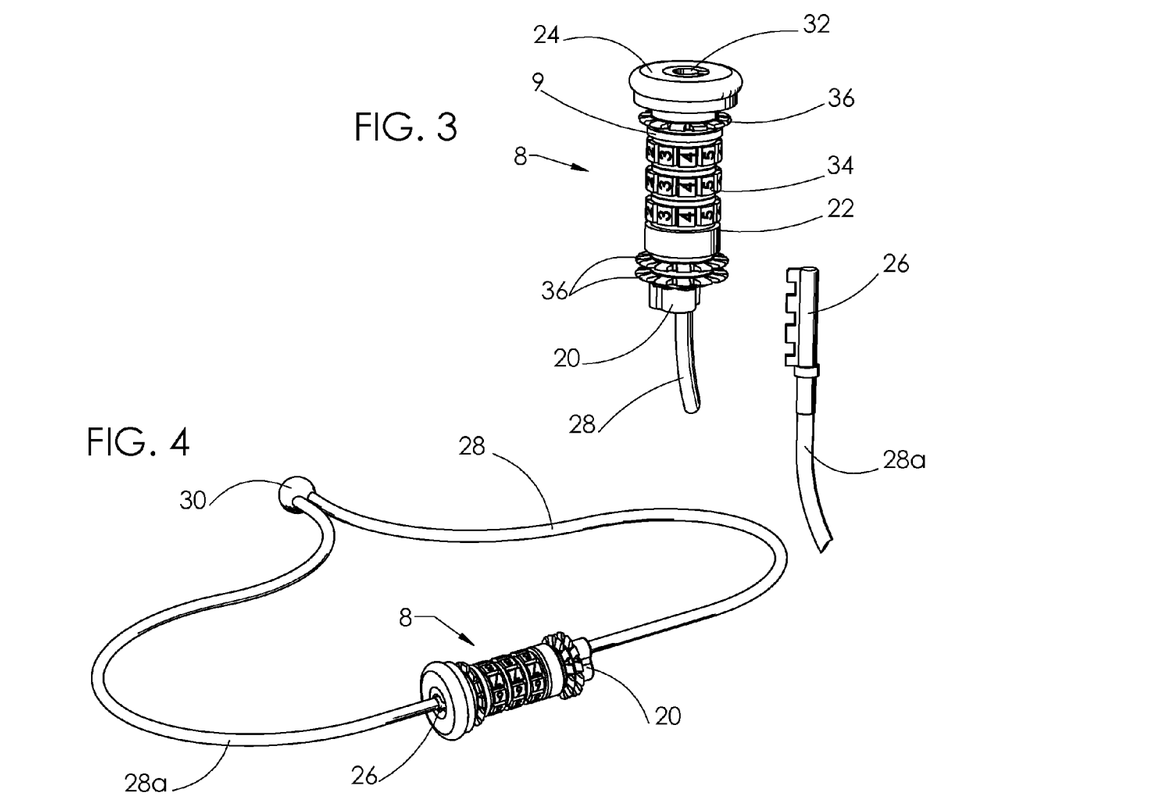
FIG. 3 is a perspective view of the ends of the cable lock.
FIG. 4 is a perspective view of the cable lock in a connected position.

The lock assembly 8 and toothed pin 26 are best seen in FIG. 3 in a perspective view of the lock assembly with lock mechanism. The preferred mechanism is a combination-style lock having a plurality of individual tumblers 34. The toothed pin 26 is a well-known lock element found in cylindrical combination locks. This pin has a plurality of spaced apart teeth arranged in a line parallel to the axis of the pin. Each numbered tumbler is rotatable on a hollow shaft that terminates on its anterior end in the toothed pin hole. The shaft is a slotted cylinder with the slot the approximate width of the width of the teeth on the toothed pin 26. The shaft accepts the toothed pin 26 and allows the projection of each of the teeth through the slot and beyond the outside diameter of the shaft. In a conventional manner, each of the tumblers 34 rotating on the shaft allows axial movement of its respective tooth only when in one relative position of rotation with respect to the shaft. As shown in FIG. 3, plurality of rotating tumblers 34 are serially disposed along an elongate axis of combination lock 22. The lock can be shifted selectively between locked and open configurations. Otherwise the lock remains in a locked configuration with the toothed pin 26 locked within the lock body 9. With the toothed pin 26 inserted into the lock end cap 24 and locked into the shaft on the anterior end of the lock assembly 8 and the other cable end attached to the posterior end of the lock assembly 8, a circular shackle loop is created to secure the bicycle or an accessory.

Figure 5:
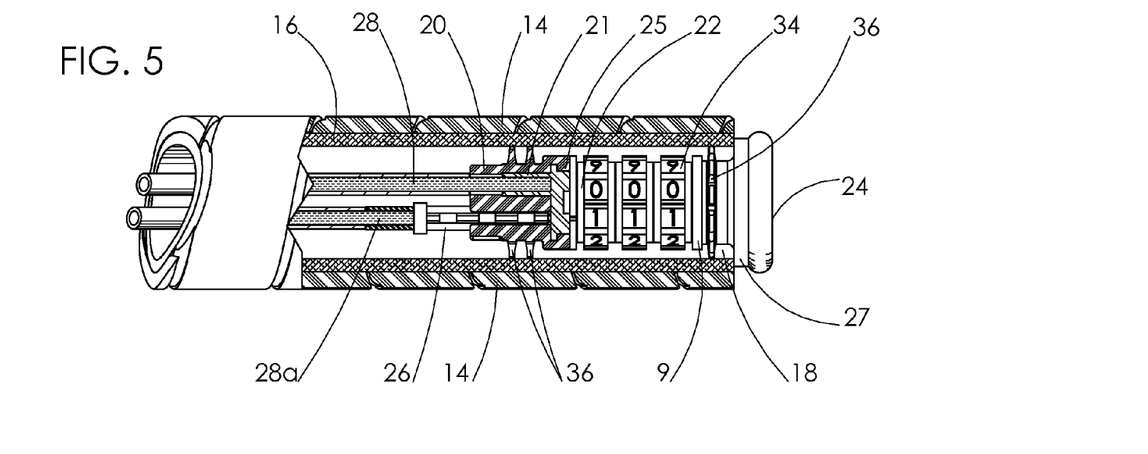
FIG. 5 is an elevation sectional view of the end portions of the cable lock inside the bicycle handlebar.

The rings of resilient friction fingers 36 are axially arranged on the lock body 9. The fingers are the preferred means to provide friction to secure the lock body within the handlebar after insertion. Alternately, these could be formed, for example, of neoprene rubber, soft polyurethane, or spring metal. In this embodiment three rubber rings are employed. A single anterior ring of friction fingers 36 is positioned just to the rear of the lock end cap 24. As shown in FIG. 3, plurality of tumblers 34 are disposed between a first set or plurality of fingers 36 and a second set or plurality of fingers 36 (e.g., fingers 36 disposed between tumblers 34 and an upper portion of end cap 24 in FIG. 3 may be described as the first set of fingers 36, and fingers 36 disposed between tumblers 34 and a lower portion of pin holder 20 in FIG. 3 may be described as the second set of fingers 36). It is an integral part of a molded piece that also incorporates the lock end cap 24. The fingers are radially arranged to the axis of the lock and present flat resilient surfaces that contort to conform to the interior bore of the handlebar 10. Each individual finger 36 is able to bend in both directions of the line of axis of the lock assembly 8. In the stored configuration the fingers 36 on all of the rings will be bent over in the direction of the lock end cap 24 and the anterior of the lock. As shown in FIG. 5, the direction from fingers 36 toward lock end cap 24 may be described as a direction from fingers 36 toward opening 18, as end cap 24 is shown disposed in opening 18. Upon the grasping of the lock end cap and the beginning of the extraction of the lock assembly 8 from the handlebar bore, the fingers 36 will contort and simultaneously flip to the axially opposite position then pointing to the posterior of the lock assembly 8 until they are released from the lock bore and assume a neutral, unbent position. As shown in FIG. 5, a direction pointing from fingers 36 toward the posterior of lock assembly 8 may be described as a direction from fingers 36 away from opening 18, as the posterior of lock assembly 8 is shown disposed opposite opening 18 relative to fingers 36. No other motions other than pushing or pulling are needed to respectively insert or retract the lock assembly 8 from the handlebar 10. Rings of fingers 36 may be dimensioned to adapt to inside diameters of all commonly available handlebars to provide securing friction. Other materials and configurations for the detent function performed by these axially arranged rows of fingers 36 are possible in alternate embodiments. The novel feature of rings of rubber friction fingers 36 not only allows use of the lock with most interior handlebar diameters but also adds the least amount of weight to accomplish this feat. The rings of bent friction fingers 36 secure the lock within the handlebar, prevent the backward motion of the lock and its falling out, and also prevent vibration and noise generated from contact to the hard materials of the bars. The close spacing of the resilient rings of friction fingers 36 on adjacent sides of the combination lock tumblers 34 helps in keeping the metal rotating tumblers from contacting and marring bicycle surfaces during its employment in the lock configuration.

FIG. 4 is a perspective view of the cable lock assembly 8 in the locked mode and as it would be in use, forming a loop of cable allowing the locking of the bicycle to a secure object or to itself to prevent movement. FIG. 4 shows lock assembly 8 in the removed position. The toothed pin 26 has been pulled out of its storage position, inserted in the rubber toothed pin holder 20 attached to the rear of the three-tumbler combination lock 22 and is shown in the locked configuration inserted into the toothed pin hole 32 in the face of the lock end cap 24. The insertion of the toothed pin 26 into the rubber bar end cap 24 for the locking position and use is advantageous as it maximizes the length and circular shape of the deployed cable versus previous designs that have both ends of the cable attached to and emerging from the same end of the lock housing 9 in the locked configuration.

FIG. 5 is a cross-sectional view of the tape wrapped handlebar 10 end with the lock assembly 8 in its stowed position inserted into the handlebar opening 18. A rear resilient flange 27 behind the anterior annular knob of the end cap 24 provides a seal against the handlebar opening 18 and handlebar tape 14 to protect the lock from moisture and dust. The rubber toothed pin holder 20 is attached to the rear of the lock body 9. The toothed pin 26 is in its stowed position inserted into the rubber toothed pin holder 20. As shown in FIG. 5, pin holder 20 includes a slot extending substantially parallel to the elongate axis of combination lock 22, and the plurality of teeth of pin 26 are positioned between first and second opposing sidewalls of the slot in the stowed position. The rubber pin holder 20 affixed to the rear of the lock securely holds the two strands of the cable together during the stowing, removing, and storage within the handlebar of the lock. This aids in the insertion and extraction process and keeps the toothed pin 26 secure during storage so vibration and noise is not produced by its interaction with the interior of the handlebar. One of the plastic coated cables 28 is crimped into a crimping ferrule 21 cast into the lock body 9. The rubber toothed pin holder 20 is shown in cross section surrounding the end of the plastic coated cable 28, the crimping ferrule 21, and the stowed toothed pin 26. The other plastic coated cable 28a is crimped into the end of the toothed pin 26.

The two rings of resilient friction fingers 36 near the posterior of the lock assembly 9 share the same material and design features of the anterior ring. As shown in FIG. 5, fingers 36 project substantially perpendicular to the elongate axis of combination lock 22. The rear rings are stacked in close proximity to each other and have their sets of fingers in the same position rotationally in respect to the axis of the lock body. The two rings 36 are an integral part of the molded resilient toothed pin holder 20. Directly anterior to the rings and similarly part of the same resilient molded toothed pin holder 20 is a cylindrical flange 25 that is secured in a cylindrical groove in the posterior end of the lock body 9. It is this attachment that secures the entire toothed pin holder 20 to the lock body 9.

The insertion of the toothed pin 26 into the rubber bar end cap 24 for the locking position and use is advantageous as it maximizes the length and circular shape of the deployed cable versus previous designs that have both ends of the cable attached to and emerging from the same end of the lock assembly 8 in the locked configuration.

Figure 6:
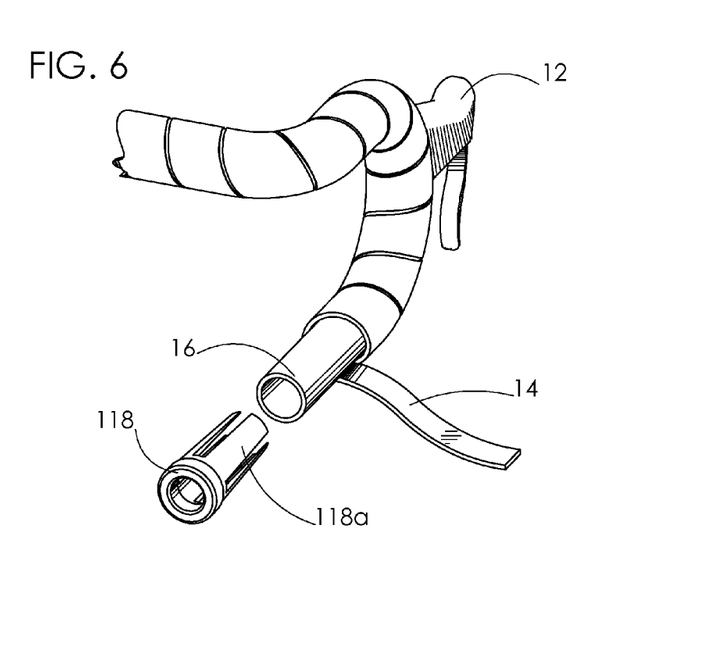
FIG. 6 is a perspective view of a portion of the handlebar with the handlebar tape removed to allow attachment of a rubber bar end cap.

While the lock can be stored in any tube of suitable size, this disclosure contemplates an alternative embodiment that provides friction to secure the lock body within the handlebar after insertion. FIG. 6 is a perspective view of a rubber cap end 118 and the exposed end of handlebar 16 which the rubber end cap 118 is slid onto the outside surface during installation. The handlebar tape 14 is then wound around the plurality of tapered rubber end cap flaps 118a, securing the rubber end cap 118 to the end of the handlebar 16. The installed rubber end cap 118 with the securing handlebar tape 14 is shown also in cross-section in FIG. 7. The internal diameter of the anterior end of the rubber end cap 118 is sized to grip the fixed diameter of the exterior surfaces of a plurality of the combination lock tumblers 34. This embodiment provides the needed friction to secure the lock assembly 8 within the handlebar 10 during storage.

Figure 7:
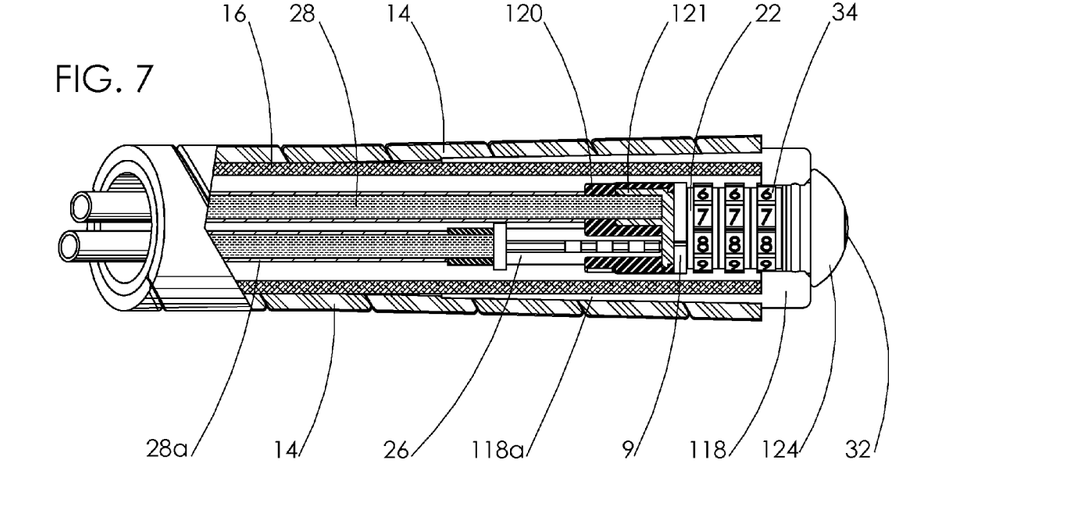
FIG. 7 is an elevation section view of the end portions of the cable lock in an alternate embodiment inside a bicycle handlebar.

The alternate embodiment for providing friction to secure the lock can be seen in FIG. 7 in a cross-sectional view of the tape wrapped handle bar 10 end with the three tumbler combination lock 22 in its stowed position inserted in the rubber bar end cap 118. A metal lock end cap 124 with a toothed pin hole forms the anterior end of the lock body 9. Rubber bar end flaps 118a are seen lying on the outside of the handlebar 16 and secured by wraps of the handlebar tape 14. The resilient bar end cap 118 is shown in cross-section and in contact with combination lock tumblers 34. A rubber toothed pin holder 120 is attached to the rear of the metal lock body 9. In this embodiment, the friction fingers 36 shown in FIG. 3 attached to the front and rear of the lock body 9 in the preferred embodiment are absent. The toothed pin 26 is in its stowed position inserted into the rubber toothed pin holder 120. One of the plastic coated cables 28 is crimped into a crimping ferrule 121 cast into the rear of the lock body 9. The rubber toothed pin holder 120 is shown in cross-section surrounding the end of the plastic coated cable 28, the crimping ferrule 121, and the stowed toothed pin 26. The other plastic coated cable 28a is shown crimped into the end of the toothed pin 26.

Operation

To Lock: The cable lock assembly 8 is taken from its stowed position by grasping the lock end cap 24 and pulling the lock assembly out of the taped handlebar 10. The correct three number combination is set on the three-tumbler combination lock 22. The toothed pin 26 is pulled out of the rubber toothed pin holder 20 and the cable is then wrapped around both a secure object and the desired bicycle component. The toothed pin 26 is then fully inserted into the toothed pin hole 32 with all three tumblers 34 set to the proper combination. The three tumblers 34 are then spun to random positions. The bicycle is thus locked.

To Unlock and Stow: The proper three number combination is set on the three tumbler combination lock 22 and the toothed pin 26 removed from the toothed pin hole 32. The toothed pin 26 is inserted into the rubber toothed pin holder 20 on the rear of the lock body 9. Starting with the plastic ball end 30, the lock assembly is inserted into the handlebar opening 18 until the entire lock body 9 and three-tumbler combination lock 22 is fully inserted into the handlebar opening 18 and only the lock end cap 24 is exposed. The lock is thus stowed.

Improved Sound-Dampening

Figure 8:
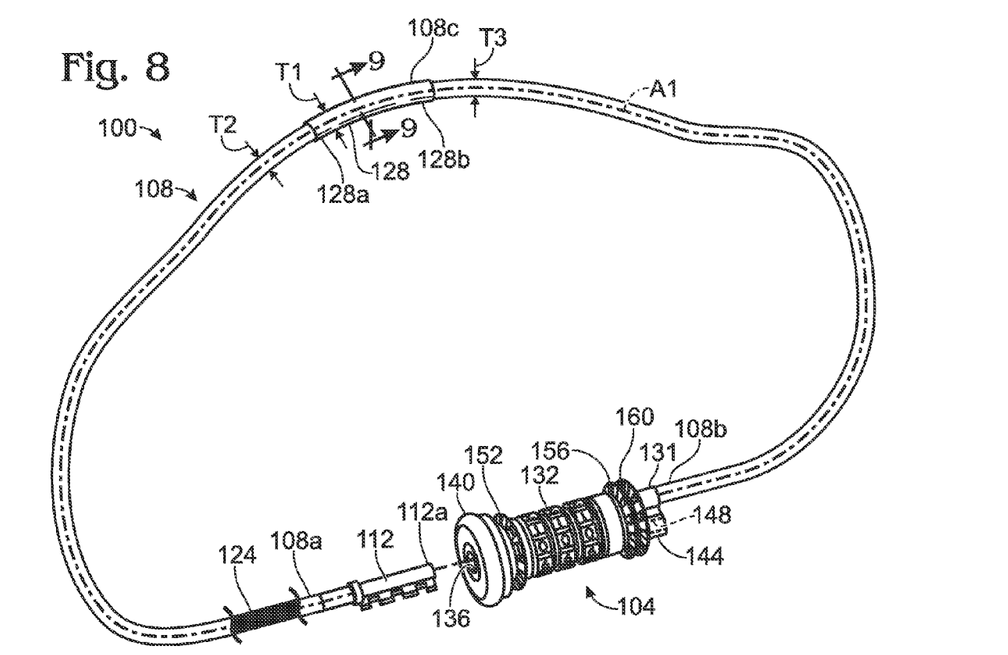
FIG. 8 is a perspective view of another embodiment of a lock assembly including a shackle.
Figure 9:
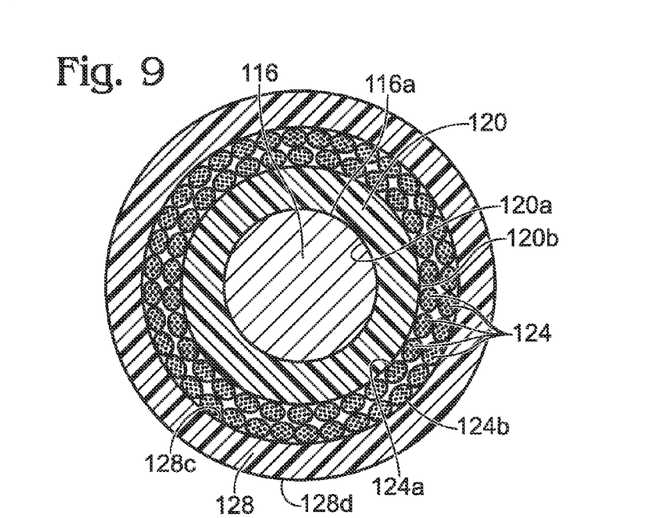
FIG. 9 is a cross-sectional view of the shackle of taken along line 9-9 in FIG. 8.
Figures 10, 11:
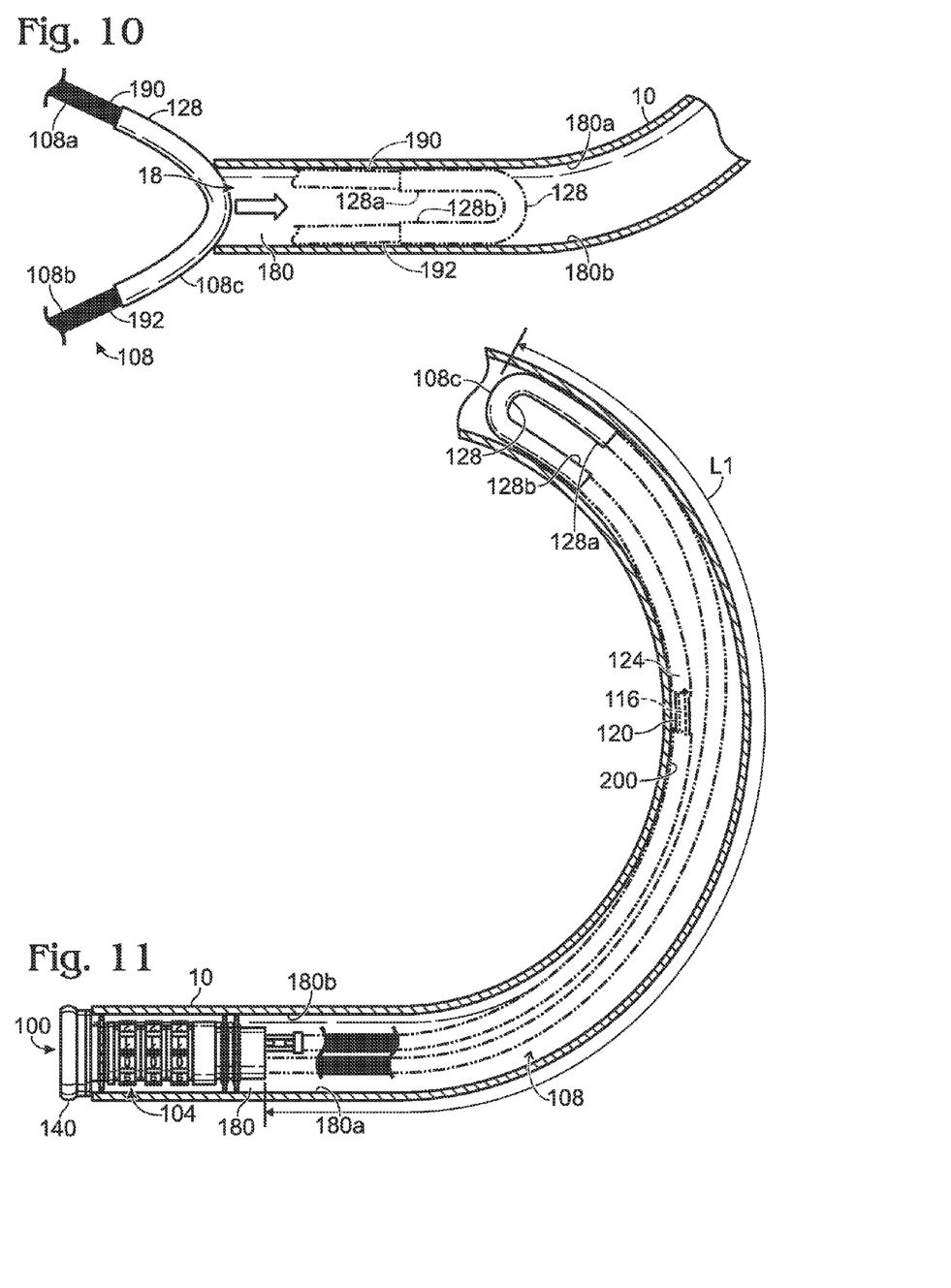
FIG. 10 is a semi-schematic elevation view showing a portion of the lock assembly of FIG. 8 being inserted into a bore of the handlebar of FIG. 1, with the handlebar shown here in cross-section.
FIG. 11 is a semi-schematic elevation view showing the lock assembly of FIG. 8 inserted into the bore to a stowed position.

FIGS. 8-11 show a lock assembly, generally indicated at 100. Lock assembly 100 may include one or more features, as described below, which may be configured to reduce noise produced by lock assembly 100 during vibrations of the handlebar when lock assembly 100 is in a stowed position therein, as shown in FIG. 11, and/or reduce abrasion of one or more components of the lock assembly as the lock assembly is being operated to the stowed position.

Referring to FIGS. 8 and 9, lock assembly 100 may include a lock body, generally indicated at 104, and a shackle, generally indicated at 108. Shackle 108 may have a first end portion 108a, a second end portion 108b, and a central portion 108c between first and second end portions 108a, 108b. For example, first end portion 108a, central portion 108c, and second end portion 108b may be serially disposed along a long axis A1 of shackle 108. As shown, shackle 108 may be a flexible shackle, and as such, long axis A1 may bend when shackle 108 is bent, and may be straight when shackle 108 is straight.

Portion 108a may include (or be connected to) a locking member 112, which may be similar to pin 26 described above with reference to FIGS. 1-7. For example, locking member 112 is shown here as a toothed pin, which may be crimped or otherwise secured to portion 108a. Portion 108b may be connected to lock body 104 (e.g., to a rear end portion of lock body 104). For example, portion 108b may be crimped or otherwise secured to lock body 104. As shown, shackle 108 may include a cable 116, a cable housing 120, and a layer of cushioning material 124 extending between the portions 108a, 108b.

Cushioning material 124 may be configured to cushion impacts of shackle 108 against the handlebar when in the stowed position, as described below in more detail, thereby reducing noise produced by shackle 108 during vibrations of the handlebar. For example, cushioning material 124 may be a woven material, as is shown. The woven material may form a sleeve (e.g., a cushioning sleeve) that surrounds cable 116 from first end portion 108a to second end portion 108b. The woven material of the sleeve may be made of a plurality of woven fibers, which may be substantially cut-resistant. For example, the woven fibers may be woven aramid fibers (or other substantially cut-resistant material) configured to hinder cutting of shackle 108, which may increase the security of lock assembly 100. An example of such woven material is Aramid Armor produced by Techflex, Inc. (see, www.techflex.com/prod_kvx.asp).

However, in some embodiments, cushioning material 124 may not be a woven material, but may still provide noise reduction by slowing down accelerations of the cable relative to the handlebar. For example, cushioning material 124 may be a polymer foam material.

Cable 116, cable housing 120, and/or cushioning material 124 may extend between first and second end portions 108a, 108b of cable 108. In the example shown, cable 116, cable housing 120, and cushioning material 124 may extend continuously from first end portion 108a (e.g., from a location or region where shackle 108 connects to locking member 112) to second end portion 108b (e.g., to a location or region where shackle 108 connects to the rear end portion of lock body 104), which may further improve security and sound-dampening characteristics of lock assembly 100. However, in some embodiments, one or more of these components may not extend continuously from first end portion 108a to second end portion 108b. For example, cable 116 may include discrete first and second cable sections spaced apart from one another by a gap, with the first cable section extending from first end portion 108a to a first location proximal central portion 108c, and the second cable section extending from second end portion 108b to a second location proximal central portion 108c and spaced apart from the first location by the gap or other suitable distance.

Cushioning material 124 may surround cable 116 along axis A1 between first and second end portions 108a, 108b. For example, as shown in FIG. 9, cushioning material 124 may be (or form) the cushioning sleeve in which cable 116 is disposed, as described above. In particular, an outer surface 116a of cable 116 may face an inner surface 124a of the cushioning sleeve and an outer surface 124b of the cushioning sleeve may face away from outer surface 116a of cable 116.

Cable housing 120 may surround cable 116 (e.g., along axis A1), and may be disposed between cushioning material 124 and cable 116. For example, cushioning material 124 may surround cable housing 120 opposite cable 116. In particular, as shown in FIG. 9, outer surface 116a of cable 116 may contact an inner surface 120a of cable housing 120, and an outer surface 120b of cable housing 120 may contact inner surface 124a of cushioning material 124.

Central portion 108c may be a resilient central portion. For example, a resilient member 128 may be disposed on (or included in) central portion 108c. Resilient member 128 may have a first end 128a, a second end 128b, an inner surface 128c, and an outer surface 128d. Inner surface 128c may be disposed on central portion 108c. In particular, resilient member 128 may be a layer of resilient material (e.g., elastomer) that forms a sleeve surrounding outer surface 116a of cable 116. As shown in FIG. 9, a portion of cushioning material 124 may be sandwiched between resilient member 128 and cable 116. For example, inner surface 128c of resilient member 128 may contact outer surface 124b along the portion of cushioning material 124.

Sandwiching cushioning material 124 between resilient member 128 and cable 116 may streamline a process of manufacturing lock assembly 100. For example, cable housing 120 may be a layer of polymer material extruded over cable 116. The sleeve formed by cushioning material 124 may then be slid over cable 116 and extruded cable housing 120. Resilient member 128, which may be a section of resilient shrink wrap sleeving, may be slid over cushioning material 124 and placed in a position approximately centrally disposed between first and second end portions 108a, 108b on central portion 108c. The shrink wrap sleeving may then be heated to reduce a diameter of the shrink wrap sleeving to secure the shrink wrap sleeving in position by sandwiching (or gripping) cushioning material 124 between the shrink wrap sleeving and cable 116.

Alternatively, cushioning material 124 may include first and second sections of cushioning material, and the shrink wrap sleeving may be secured to cable housing 120 in a gap separating the first and second sections of cushioning material in central portion 108*c*. However, as compared to the above described sandwiched configuration, such a non-sandwiched configuration may be less secure (e.g., more easily cut in central portion 108*c* due to a lack of cut-resistant cushioning material in that portion) and/or may result in increased abrasion of cushioning material 124 when lock assembly 100 is operated from a removed position (as shown in FIG. 8) to the stowed position (as shown in FIG. 11), for example, by edges of the cushioning material dragging against and being abraded by the interior surface of the handlebar.

Resilient central portion 108*c* may have a thickness T1 in a direction perpendicular to the long axis of shackle 108. Similarly, portions 108*a*, 108*b* proximal portion 108*c* may have respective thicknesses T2, T3 in the direction perpendicular to the long axis of shackle 108. Thickness T1 being greater than either of thicknesses T2, T3 may provide resilient central portion 108*c* with a greater resiliency as compared to either of first or second end portions 108*a*, 108*b* proximal resilient central portion 108*c*, and/or may prevent either of portions 108*a*, 108*b* proximal central portion 108*c* from contacting the interior surface of the bore of the handlebar when the lock assembly is inserted therein, as will be described below in more detail.

Also as shown in FIG. 8, shackle 108 may have a length that extends from a distal end 112*a* of locking member 112 to a location 131 where second end portion 108*b* of shackle 108 connects to lock body 104. Resilient member 128 may have an overall length (e.g., extending from first end 128*a* to second end 128*b*) that is less than a minority of the length of the shackle. Such a configuration may reduce noise produced by shackle 108 in the stowed position, as will also be described below in further detail.

Lock body 104 may be similar in structure and function to lock body 9 and components connected thereto, such as those shown and described with reference to FIGS. 1-7. For example, lock body 104 may include a plurality of rotating tumblers 132 (e.g., similar to tumblers 34), and a hole 136 (e.g., similar to hole 32). In particular, hole 136 may be configured to receive locking member 112 when tumblers 132 are in an open position, and lock body 104 may be configured to prevent removal of locking member 112 from hole 136 when tumblers 132 are in a locked position. While FIGS. 8 and 11 show tumblers 132 to be included in a combination lock, other embodiments may include the tumblers in a keyed lock, or any other suitable mechanism for selectively securing locking member 112 in hole 136.

An end cap 140 (e.g., similar to end cap 24) may be connected to (or included in) a front end portion of lock body 104, and locking member holder 144 (e.g., similar to pin holder 20) may be connected to (or included in) a rear end portion of lock body 104. Hole 136 may extend through end cap 140, and holder 144 may include a shaped chamber 148 for selective reception of locking member 112. As also shown in FIG. 8, lock body 104 may include first, second, and third rings 152, 156, and 160 of resilient friction fingers. These friction fingers may be similar both in structure and function to fingers 36 described above with reference to FIGS. 1-7.

As mentioned above, lock assembly 100 may be operable between the removed position, as shown in FIG. 8, and the stowed position, as shown in FIG. 11. For example, operating lock assembly 100 from the removed position toward the stowed position may involve a user inserting locking member 112 into shaped chamber 148 of holder 144, folding shackle 108 to move resilient member 128 from a substantially expanded (and/or unfolded) state, as shown in FIG. 8, to a substantially compressed (and/or folded) state, as shown in solid lines in FIG. 10, and placing folded shackle 108 in opening 18 of handlebar 10. As shown, opening 18 is an opening to the bore of handlebar 10, with the bore having an interior surface 180 with opposing sides 180*a*, 180*b*.

As shown in dash double dot lines in FIG. 10, the lock assembly may then be operated further toward the stowed position by (the user) inserting the shackle further into the bore and moving resilient member 128 to a further substantially compressed (and/or folded) state. In some examples, the user may pinch the shackle together to move resilient member 128 to the further substantially compressed state. In other examples, resilient member 128 may be moved to the further substantially compressed state by the user inserting the folded shackle into the bore to cause ends 128*a*, 128*b* of resilient member 128 to press against respective opposing sides 180*a*, 180*b* to move resilient member 128 to the further substantially compressed state.

As mentioned above with reference to FIG. 8, thickness T1 of central portion 108*c* may be greater than either of thicknesses T2, T3 of respective first and second end portions 108*a*, 108*b* proximal central portion 108*c*. Such a configuration may prevent or reduce contact between leading portions 190, 192 of cushioning material 124 in respective first and second end portions 108*a*, 108*b* as shackle 108 is being inserted into the bore, which may reduce abrasion of cushioning material 124 by interior surface 180 of the bore, particularly in embodiments wherein cushioning material 124 is a woven material, but also in embodiments wherein cushioning material is another material that is susceptible to abrasion.

The user may continue inserting the lock assembly into the bore of handlebar 10 until the lock assembly is operated (or inserted) to the stowed position. First and second ends 128*a*, 128*b* of resilient member 128 may continually (or substantially continually) slide against respective opposing surfaces 180*a*, 180*b* of the bore, as lock assembly 100 is being inserted from the removed position to the stowed position. As shown in FIG. 11, the lock assembly in the stowed position may correspond to the shackle (including central portion 108*c*) and the rear end portion of lock body 104 contained within the bore, a rear end of end cap 140 contacting (or proximate) the opening, and/or the friction fingers pressing against opposing sides 180*a*, 180*b* to prevent lock body 104 from inadvertently slipping out of the handlebar bore. The stowed position may correspond to the resilient member 128 in the further compressed state to hold shackle 108 against opposing sides 180*a*, 180*b* by first end 128*a* pressing against one of the opposing sides (e.g., side 180*a*) and by second end 128*b* pressing against the other of the opposing sides (e.g., side 180*b*). By holding the shackle against opposing sides 180*a*, 180*b* of the bore, resilient member 128 may reduce movement of shackle 108 relative to interior surface 180 of the bore during vibrations of handlebar 10, thereby reducing noise produced by shackle 108 in the stowed position.

In FIG. 11, a section of cushioning material 124 has been sectioned away to indicate an orientation of cable 116 relative to interior surface 180 and cushioning material 124. Accordingly, the stowed position may correspond to cushioning material 124 (e.g., the cushioning sleeve) disposed between cable 116 and interior surface 180 of the bore, and/or cushioning material in contact with interior surface 180, which may reduce accelerations of cable 116 relative to interior surface 180 caused by vibrations of the handlebar thereby (further) reducing noise produced by the shackle in the stowed position during such vibrations. For example, a change in momentum Δp of cable 116 relative to interior surface 180 as interior surface 180 exerts a force F on cable 116 (e.g., via the cable housing and the cushioning material) in a duration of time Δt may be described mathematically as Δp=F ΔM. Thus, for a given change of momentum Δp of cable 116, increasing the associated duration of time Δt will decrease an equal and opposite associated force F exerted on interior surface 180 by cable 116. Similarly, for the given change of momentum Δp of cable 116, decreasing the associated duration of time Δt will increase the associated force F exerted on interior surface 180 by cable 116. As such, a louder noise may be produced by the shackle in the stowed position during vibrations of the handlebar when cable 116 exerts a larger force on the interior surface over a shorter duration of time (e.g., a sudden, strong impact), and a quieter noise may be produced by the shackle in the stowed position during vibrations of the handlebar when cable 116 exerts a smaller force on the interior surface over a longer duration of time (e.g., a gradual, less-strong impact). Accordingly, reducing associated force F and increasing Δt may be accomplished by disposing a compressible material, such as cushioning material 124, between cable 116 and interior surface 180.

For example, fibers of cushioning material 124 may be less compressed together in the direction perpendicular to axis A1 when cable 116 is not pressing cushioning material 124 against interior surface 180. During a change of momentum of cable 116 relative to interior surface 180, cable 116 may press cushioning material 124 against interior surface 180 (e.g., via cable housing 120), such that the fibers of cushioning material 124 become more compressed together in the direction perpendicular to axis A1, thereby slowing acceleration of cable 116 (e.g., by reducing the associated force F and increasing Δt for a given Δp) toward interior surface 180, resulting in less noise than would otherwise be produced.

Cushioning material 124 may be more compressible than cable 116 and/or cable housing 120 in the direction perpendicular to axis A1. For example, cable housing 120 may be made of a polymer material that is less compressible than cushioning material 124 in the direction perpendicular to axis A1, and cable 116 may be made of a metallic material, such as steel, which is less compressible that cushioning material 124 and cable housing 120 in the direction perpendicular to axis A1.

In the stowed position, shackle 108 may extend through a length L1 of the bore of handlebar 10, which is shown in FIG. 11 as a curved length. In this stowed position, outer surface 124b of cushioning sleeve 124 may be exposed to interior surface 180 of the bore through a majority of length L1, and outer surface 128d of resilient member 128 may contact a minority of length L1, as shown. Such a configuration may be preferable, for example, because the outer surface of resilient member 128 may be harder than the outer surface of cushioning material 124, and if such a harder outer surface of resilient member 128 where exposed to (or in contact with) a majority of length L1, then that harder outer surface may rattle against interior surface 180 during handlebar vibrations, thereby undesirably increasing noise produced by the shackle in the stowed position.

While cushioning material 124 may be configured to reduce noise caused by accelerations of cable 116 relative to interior surface 180, the outer surface of cushioning material 124 may be more susceptible to abrasion by interior surface 180 than either of the respective outer surfaces of cable housing 120 or cable 116. Thus, when operating lock assembly between the removed and stowed positions, it may be preferable to reduce frictional forces between the outer surface of cushioning material 124 and interior surface 180 thereby reducing abrasion of cushioning material 124 by interior surface 180, which may extend the operational life and visual appearance of cushioning material 124. To this end, resilient member 128 may be configured to reduce such frictional forces between the outer surface of cushioning material 124 and interior surface 180. For example, resilient member 128 may be configured to smoothly guide the shackle through the bore, and reduce the force required for insertion as the lock assembly is being operated from the removed position to the stowed position. In particular, the outer surface of resilient member 128 may have a lower coefficient of friction than the outer surface of cushioning material 124. More specifically, a coefficient of friction between the outer surface of resilient member 128 and interior surface 180 may be less than a coefficient of friction between the outer surface of cushioning material 124 and interior surface 180. Further, shackle 108 (e.g., including such coefficients of friction) may be configured such that the outer surface of resilient member 128 and the outer surface of cushioning material 124 both contact interior surface 180 of the bore as the lock assembly is being operated toward the stowed position, and such that the outer surface of the resilient member 128 contacts a given location on interior surface 180, such as a location 200 (see FIG. 11), before the outer surface of cushioning material 124 contacts the given location. Such a guiding configuration of resilient member 128 relative to cushioning material 124 may prevent shackle 108 from "bunching-up" inside of the bore, and reduce a frictional force between the outer surface of cushioning material 124 and interior surface 180 which might otherwise occur (e.g., if the shackle was to bunch up inside of the bore). Moreover, the portion of cushioning material 124 sandwiched between resilient member 128 and cable 116 may be continually prevented from contacting interior surface 180, as resilient member 128 is continually disposed between interior surface 180 and that portion of cushioning material 124 as the lock assembly is being operated from the removed position to the stowed position.

To remove (e.g., completely remove) lock assembly 100 from handlebar 10 (e.g., to operate lock assembly 100 from the stowed position to the removed position shown in FIG. 8), the user may grasp end cap 140 and withdraw lock assembly 100 from the bore. As lock assembly 100 is being withdrawn, first and second ends 128a, 128b of resilient member 128 may continually (or substantially continually) slide against respective opposing surfaces 180a, 180b of the bore. Once lock assembly 100 is operated to the removed position, the resiliency of the material of resilient member 128 may restore (or substantially return) resilient member 128 to the substantially uncompressed state, as shown in FIG. 8. The user may then wrap shackle 108 around a first object, such as a portion of the bicycle or a portion of a helmet, and secure the first object to a second object, such as a bench or a pole, by also wrapping shackle 108 around the second object and inserting locking member 112 into hole 136 (e.g., with tumblers 132 in the open position) to form a loop in lock assembly 100 that wraps around both the first and second objects, and then operating tumblers 132 to the locked position to prevent removal of locking member 112 from hole 136.

The following describes additional aspects and features of disclosed embodiments, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A lock assembly for a bicycle, the lock assembly comprising: a shackle having a first end portion, a second end portion, and a central portion between the first and second end portions, the first end portion including a locking member, the shackle including a cable disposed in a cushioning sleeve such that an outer surface of the cable faces an inner surface of the cushioning sleeve and an outer surface of the cushioning sleeve faces away from the outer surface of the cable, the cable and the cushioning sleeve extending between the first and second end portions; a resilient member having a first end, a second end, an inner surface, and an outer surface, the inner surface of the resilient member being disposed on the central portion of the shackle; and a lock body connected to the second end portion of the shackle, the lock body including a plurality of rotating tumblers, the lock body including a hole for receiving the locking member when the plurality of rotating tumblers are in an open position, the lock body being configured to prevent removal of the locking member from the hole when the plurality of rotating tumblers are in a locked position; wherein the lock assembly is operable between a stowed position and a removed position, the stowed position corresponding to the central portion of the shackle contained within a bore of a handlebar of the bicycle, the resilient member in a compressed state to hold the shackle against opposing sides of an interior surface of the bore by the first end of the resilient member pressing against one of the opposing sides and the second end of the resilient member pressing against the other of the opposing sides to reduce movement of the shackle relative to the interior surface during vibrations of the handlebar thereby reducing noise produced by the shackle in the stowed position during such vibrations, and the cushioning sleeve disposed between the cable and the interior surface and in contact with the interior surface to reduce acceleration of the cable relative to the interior surface caused by such vibrations of the handlebar thereby further reducing noise produced by the shackle in the stowed position during such vibrations, the removed position corresponding to the lock assembly removed from the bore, and the resilient member in an expanded state.

A1. The lock assembly of paragraph A0, wherein the shackle has a length extending from a distal end of the locking member to a location where the second end portion of the shackle connects to the lock body, the resilient member having an overall length that is less than a minority of the length of the shackle.

A2. The lock assembly of paragraph A0, wherein a coefficient of friction between the outer surface of the resilient member and the interior surface of the bore is less than a coefficient of friction between the outer surface of the cushioning sleeve and the interior surface of the bore.

A3. The lock assembly of paragraph A2, wherein in the stowed position the shackle extends through a length of the bore, the outer surface of the cushioning sleeve being exposed to the interior surface of the bore through a majority of the length in the stowed position, the outer surface of the resilient member contacting a minority of the length in the stowed position.

A4. The lock assembly of paragraph A3, wherein the cushioning sleeve is made of woven aramid fibers.

B0. A lock assembly for a bicycle, the lock assembly comprising: a flexible shackle having a long axis, and a first end portion, a resilient central portion, and a second end portion serially disposed along the long axis, the resilient central portion having a greater thickness than the first and second end portions proximal the resilient central portion in a direction perpendicular to the long axis, the first end portion including a locking member; and a lock body connected to the second end portion of the shackle, the lock body including a plurality of rotating tumblers, the lock body including a hole for receiving the locking member when the plurality of rotating tumblers are in an open position, the lock body being configured to prevent removal of the locking member from the hole when the plurality of rotating tumblers are in a locked position; wherein the lock assembly is operable between a stowed position and a removed position, the stowed position corresponding to the shackle and a rear end portion of the lock body being contained within a bore of a handlebar of the bicycle, and the resilient central portion in a substantially folded state to press the shackle against opposing sides of the bore and thereby reduce noise produced by the shackle in the stowed position during vibrations of the handlebar; the removed position corresponding to the lock assembly removed from the bore, and the resilient central portion in a substantially unfolded state.

B1. The lock assembly of paragraph B0, wherein the shackle includes a cable extending between the first and second end portions, the resilient central portion being formed by a layer of resilient material surrounding an outer surface of the cable.

B2. The lock assembly of paragraph B1, wherein the shackle includes a layer of cushioning material surrounding the cable, the layer of cushioning material being configured to reduce accelerations of the cable relative to an interior surface of the bore caused by the vibrations of the handlebar thereby further reducing noise produced by the shackle in the stowed position.

B3. The lock assembly of paragraph B2, wherein a portion of the cushioning material is sandwiched between the layer of resilient material and the cable.

B4. The lock assembly of paragraph B3, wherein the cushioning material is a sleeve of woven fibers.

B5. The lock assembly of paragraph B4, wherein the shackle includes a polymer cable housing surrounding the cable along the long axis, the sleeve surrounding the polymer cable housing opposite the cable, the sleeve being more compressible than the polymer cable housing in the direction perpendicular to the long axis.

B6. The lock assembly of paragraph B4, wherein the woven fibers are substantially cut-resistant.

B7. The lock assembly of paragraph B6, wherein the woven fibers are woven aramid fibers.

C0. A lock assembly for a bicycle, the lock assembly comprising: a shackle having first and second end portions, the first end portion including a locking member, the shackle including a cable and a layer of cushioning material surrounding the cable, the cable and the cushioning material extending between the first and second end portions; and a lock body connected to the second end portion of the shackle, the lock body including a plurality of rotating tumblers, the lock body including a hole for receiving the locking member when the plurality of rotating tumblers are in an open position, the lock body being configured to prevent removal of the locking member from the hole when the plurality of rotating tumblers are in a locked position; wherein the lock assembly is operable between a stowed position and a removed position, the stowed position corresponding to the shackle and a rear end portion of the lock body being contained within a bore of a handlebar of the bicycle, and the cushioning material being disposed between the cable and an interior surface of the bore to reduce accelerations of the cable relative to the interior surface caused by vibration of the handlebar thereby reducing noise produced by the shackle in the stowed position, the removed position corresponding to the lock assembly removed from the bore of the handlebar.

C1. The lock assembly of paragraph C0, wherein the shackle includes a cable housing surrounding the cable between the cushioning material and the cable.

C2. The lock assembly of paragraph C0, wherein the cushioning material is a woven material.

C3. The lock assembly of paragraph C2, wherein the woven material forms a sleeve surrounding the cable from the first end portion to the second end portion.

C4. The lock assembly of paragraph C3, wherein the sleeve is made of woven aramid fibers configured to hinder cutting of the shackle.

C5. The lock assembly of paragraph C4, the shackle including a central portion between the first and second end portions, the central portion including a resilient material layer disposed on the sleeve opposite the cable in the central portion, the resilient material layer being configured to hold the shackle against opposing sides of the interior surface of the bore when the lock assembly is in the stowed position.

C6. The lock assembly of paragraph C5, wherein an outer surface of the resilient material layer has a lower coefficient of friction than an outer surface of the sleeve, the shackle being configured such that the outer surface of the resilient material layer and the outer surface of the sleeve both contact the interior surface of the bore as the lock assembly is being inserted into the bore toward the stowed position, and such that the outer surface of the resilient material layer contacts a given location on the interior surface of the bore before the outer surface of the sleeve contacts the given location as the lock assembly is being inserted into the bore toward the stowed position.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed is:

1. A lock assembly for a bicycle, comprising:
   a shackle having a first end portion, a second end portion, and a central portion between the first and second end portions, the first end portion including a locking member, the shackle including a cable disposed in a cushioning sleeve such that an outer surface of the cable faces an inner surface of the cushioning sleeve and an outer surface of the cushioning sleeve faces away from the outer surface of the cable, the cable and the cushioning sleeve extending between the first and second end portions;
   a resilient member having a first end, a second end, an inner surface, and an outer surface, the inner surface of the resilient member being disposed on the central portion of the shackle; and
   a lock body connected to the second end portion of the shackle, the lock body including a plurality of rotating tumblers, the lock body including a hole for receiving the locking member when the plurality of rotating tumblers are in an open position, the lock body being configured to prevent removal of the locking member from the hole when the plurality of rotating tumblers are in a locked position;
   wherein the lock assembly is operable between a stowed position and a removed position,
      the stowed position corresponding to the central portion of the shackle contained within a bore of a handlebar of the bicycle, the resilient member in a compressed state to hold the shackle against opposing sides of an interior surface of the bore by the first end of the resilient member pressing against one of the opposing sides and the second end of the resilient member pressing against the other of the opposing sides to reduce movement of the shackle relative to the interior surface during vibrations of the handlebar thereby reducing noise produced by the shackle in the stowed position during such vibrations, and the cushioning sleeve disposed between the cable and the interior surface and in contact with the interior surface to reduce acceleration of the cable relative to the interior surface caused by such vibrations of the handlebar thereby further reducing noise produced by the shackle in the stowed position during such vibrations,
      the removed position corresponding to the lock assembly removed from the bore, and the resilient member in an expanded state.

2. The lock assembly of claim 1, wherein the shackle has a length extending from a distal end of the locking member to a location where the second end portion of the shackle connects to the lock body, the resilient member having an overall length that is less than a minority of the length of the shackle.

3. The lock assembly of claim 1, wherein a coefficient of friction between the outer surface of the resilient member and the interior surface of the bore is less than a coefficient of friction between the outer surface of the cushioning sleeve and the interior surface of the bore.

4. The lock assembly of claim 3, wherein in the stowed position the shackle extends through a length of the bore, the outer surface of the cushioning sleeve being exposed to the interior surface of the bore through a majority of the length in the stowed position, the outer surface of the resilient member contacting a minority of the length in the stowed position.

5. The lock assembly of claim 4, wherein the cushioning sleeve is made of woven aramid fibers.

6. A lock assembly for a bicycle, comprising:
a flexible shackle having a long axis, and a first end portion, a resilient central portion, and a second end portion serially disposed along the long axis, the resilient central portion having a greater thickness than the first and second end portions proximal the resilient central portion in a direction perpendicular to the long axis, the first end portion including a locking member; and
a lock body connected to the second end portion of the shackle, the lock body including a plurality of rotating tumblers, the lock body including a hole for receiving the locking member when the plurality of rotating tumblers are in an open position, the lock body being configured to prevent removal of the locking member from the hole when the plurality of rotating tumblers are in a locked position;
wherein the lock assembly is operable between a stowed position and a removed position,
the stowed position corresponding to the shackle and a rear end portion of the lock body being contained within a bore of a handlebar of the bicycle, and the resilient central portion in a substantially folded state to press the shackle against opposing sides of the bore and thereby reduce noise produced by the shackle in the stowed position during vibrations of the handlebar,
the removed position corresponding to the lock assembly removed from the bore, and the resilient central portion in a substantially unfolded state.

7. The lock assembly of claim 6, wherein the shackle includes a cable extending between the first and second end portions, the resilient central portion being formed by a layer of resilient material surrounding an outer surface of the cable.

8. The lock assembly of claim 7, wherein the shackle includes a layer of cushioning material surrounding the cable, the layer of cushioning material being configured to reduce accelerations of the cable relative to an interior surface of the bore caused by the vibrations of the handlebar thereby further reducing noise produced by the shackle in the stowed position.

9. The lock assembly of claim 8, wherein a portion of the cushioning material is sandwiched between the layer of resilient material and the cable.

10. The lock assembly of claim 9, wherein the cushioning material is a sleeve of woven fibers.

11. The lock assembly of claim 10, wherein the shackle includes a polymer cable housing surrounding the cable along the long axis, the sleeve surrounding the polymer cable housing opposite the cable, the sleeve being more compressible than the polymer cable housing in the direction perpendicular to the long axis.

12. The lock assembly of claim 10, wherein the woven fibers are substantially cut-resistant.

13. The lock assembly of claim 12, wherein the woven fibers are woven aramid fibers.

14. A lock assembly for a bicycle, comprising:
a shackle having first and second end portions, the first end portion including a locking member, the shackle including a cable and a layer of cushioning material surrounding the cable, the cable and the cushioning material extending between the first and second end portions;
a sleeve surrounding the cable from the first end portion to the second end portion; and
a lock body connected to the second end portion of the shackle, the lock body including a plurality of rotating tumblers, the lock body including a hole for receiving the locking member when the plurality of rotating tumblers are in an open position, the lock body being configured to prevent removal of the locking member from the hole when the plurality of rotating tumblers are in a locked position;
wherein the lock assembly is operable between a stowed position and a removed position,
the stowed position corresponding to the shackle and a rear end portion of the lock body being contained within a bore of a handlebar of the bicycle, and the cushioning material being disposed between the cable and an interior surface of the bore to reduce accelerations of the cable relative to the interior surface caused by vibration of the handlebar thereby reducing noise produced by the shackle in the stowed position,
the removed position corresponding to the lock assembly removed from the bore of the handlebar;
the shackle including a central portion between the first and second end portions, the central portion including a resilient material layer disposed on the sleeve opposite the cable in the central portion, the resilient material layer being configured to hold the shackle against opposing sides of the interior surface of the bore when the lock assembly is in the stowed position; and
wherein an outer surface of the resilient material layer has a lower coefficient of friction than an outer surface of the sleeve, the shackle being configured such that the outer surface of the resilient material layer and the outer surface of the sleeve both contact the interior surface of the bore as the lock assembly is being inserted into the bore toward the stowed position, and such that the outer surface of the resilient material layer contacts a given location on the interior surface of the bore before the outer surface of the sleeve contacts the given location as the lock assembly is being inserted into the bore toward the stowed position.

15. The lock assembly of claim 14, wherein the shackle includes a cable housing surrounding the cable between the cushioning material and the cable.

16. The lock assembly of claim 14, wherein the cushioning material is a woven material.

17. The lock assembly of claim 16, wherein the woven material forms the sleeve surrounding the cable from the first end portion to the second end portion.

18. The lock assembly of claim 17, wherein the sleeve is made of woven aramid fibers configured to hinder cutting of the shackle.

* * * * *